United States Patent
Miyatake et al.

(10) Patent No.: US 12,526,058 B2
(45) Date of Patent: Jan. 13, 2026

(54) OPTICAL POWER SUPPLY SYSTEM, OPTICAL POWER SUPPLY METHOD AND POWER RECEIVING OPTICAL COMMUNICATION APPARATUS

(71) Applicant: NTT, Inc., Tokyo (JP)

(72) Inventors: Ryo Miyatake, Musashino (JP); Hiroaki Katsurai, Musashino (JP); Tomoaki Yoshida, Musashino (JP)

(73) Assignee: NTT, Inc., Tokyo (JP)

( * ) Notice: Subject to any disclaimer, the term of this patent is extended or adjusted under 35 U.S.C. 154(b) by 315 days.

(21) Appl. No.: 18/265,333

(22) PCT Filed: Dec. 15, 2020

(86) PCT No.: PCT/JP2020/046676
§ 371 (c)(1),
(2) Date: Jun. 5, 2023

(87) PCT Pub. No.: WO2022/130483
PCT Pub. Date: Jun. 23, 2022

(65) Prior Publication Data
US 2024/0039642 A1    Feb. 1, 2024

(51) Int. Cl.
*H04B 10/80* (2013.01)
(52) U.S. Cl.
CPC .................. *H04B 10/807* (2013.01)
(58) Field of Classification Search
None
See application file for complete search history.

(56) References Cited

U.S. PATENT DOCUMENTS

2015/0061401 A1    3/2015    Nago

FOREIGN PATENT DOCUMENTS

| JP | 2010193374 | 9/2010 | |
|----|-----------|--------|-|
| JP | 2016123266 | 7/2016 | |
| JP | 2019170144 | 10/2019 | |
| WO | WO 2011158283 | 12/2011 | |
| WO | WO-2011158283 A1 * | 12/2011 | ........... H04B 10/807 |

* cited by examiner

*Primary Examiner* — David W Lambert
(74) *Attorney, Agent, or Firm* — Fish & Richardson P.C.

(57) ABSTRACT

An optical power supply system includes a power supply optical communication device that supplies power using an optical signal for power supply and a power reception optical communication device that is driven by power obtained from the optical signal for power supply transmitted from the power supply optical communication device, wherein the power supply optical communication device includes an optical power supply unit that transmits the optical signal for power supply to the power reception optical communication device and a data transmission/reception unit that transmits the optical signal for power supply to the power reception optical communication device when there is no data to be transmitted to the power reception optical communication device, and the power reception optical communication device includes a power storage unit that stores power obtained based on the optical signal for power supply transmitted from the optical power supply unit and the optical signal for power supply transmitted from the data transmission/reception unit.

15 Claims, 8 Drawing Sheets

OPTICAL POWER SUPPLY SYSTEM, OPTICAL POWER SUPPLY METHOD AND POWER RECEIVING OPTICAL COMMUNICATION APPARATUS

CROSS-REFERENCE TO RELATED APPLICATIONS

This application is a National Stage application under 35 U.S.C. § 371 of International Application No. PCT/JP2020/046676, having an International Filing Date of Dec. 15, 2020.

The disclosure of the prior application is considered part of the disclosure of this application, and is incorporated by reference in its entirety into this application.

TECHNICAL FIELD

The present invention relates to an optical power supply system, optical power supply method and power reception optical communication device.

BACKGROUND ART

A conventional optical power supply system shown in PTL 1 has been proposed. In the optical power supply system shown in PTL 1, an optical signal (referred to "power supply light" below) for power supply transmitted from OLT (Optical Line Terminal) is received by ONU (Optical Network Unit), then power is supplied from the OLT. In the optical power supply system shown in PTL 1, the same wavelength is used for the optical signal used for power supply and the optical signal for communication, thereby eliminating the need for expensive optical multiplexer and optical demultiplexer used for separating wavelengths for power supply and communication. Therefore, the configuration cost of the optical power supply system can be suppressed.

CITATION LIST

Patent Literature

[PTL 1] Japanese Patent Application Laid-open No. 2010-193374

SUMMARY OF INVENTION

Technical Problem

In the above-described ONU, some functions are set in a sleep state in order to reduce the amount of power consumption supplied. In a configuration shown in PTL 1, an operation is controlled by periodically generating an operation trigger by using a timer. However, the power stored by the optical power supply cannot perform communication until sufficient charging is possible. Therefore, there is a possibility that convenience as communication equipment may be impaired. Then, it is desired to increase the communication available time by improving the charging efficiency.

With the foregoing in view, an object of the present invention is to provide a technique which can improve the charging efficiency by the optical power supply.

Solution to Problem

An aspect of the present invention is an optical power supply system including a power supply optical communication device that supplies power using an optical signal for power supply, and a power reception optical communication device that is driven by power obtained from the optical signal for power supply transmitted from the power supply optical communication device, wherein the power supply optical communication device includes an optical power supply unit that transmits the optical signal for power supply to the power reception optical communication device, and a data transmission/reception unit that transmits the optical signal for power supply to the power reception optical communication device when there is no data to be transmitted to the power reception optical communication device, and the power reception optical communication device includes a power storage unit that stores power obtained based on the optical signal for power supply transmitted by the optical power supply unit and the optical signal for power supply transmitted by the data transmission/reception unit.

An aspect of the present invention is an optical power supply method performed by a power supply optical communication device that supplies power using an optical signal for power supply and a power reception optical communication device that is driven by power obtained from the optical signal for power supply transmitted from the power supply optical communication device, wherein the power supply optical communication device transmits the optical signal for power supply to the power reception optical communication device, transmits the optical signal for power supply to the power reception optical communication device when there is no data to be transmitted to the power reception optical communication device, and the power reception optical communication device stores power obtained on the basis of the optical signal for power supply transmitted from the power supply optical communication device via a plurality of paths.

An aspect of the present invention is a power reception optical communication device in an optical power supply system including a power supply optical communication device that supplies power using an optical signal for power supply and a power reception optical communication device that is driven by power obtained from the optical signal for power supply transmitted from the power supply optical communication device, and includes a power storage unit that stores power obtained based on the optical signal for power supply transmitted from the power communication device via a plurality of paths.

Advantageous Effects of Invention

According to the present invention, the charging efficiency by the optical power supply can be improved.

DESCRIPTION OF EMBODIMENTS

The following describes an embodiment of the present invention with reference to the drawings.

Outline

An outline of an optical power supply system according to the present invention will be described.

In an optical communication system for performing an optical power supply, a power supply optical communication device transmits a power supply light to a power reception optical communication device via a line (referred to "communication line" below) which transmits and receives data with the power reception optical communication device while transmitting the power supply light to the power reception optical communication device via a line (referred to "power supply line" below) which transmits the power supply light, when there is no data to be transmitted (referred to "transmission data" below) to the power reception optical communication device. The power reception optical communication device performs charging on the basis of the power supply light transmitted from the power supply optical communication device through each of the plurality of lines.

With the above-described configuration, since the number of lines for charging increases from one line to a plurality of lines, the charging efficiency per unit time can be improved. Hereinbelow, a specific configuration will be described with exemplifying a plurality of embodiments.

First Embodiment

Figure 1:
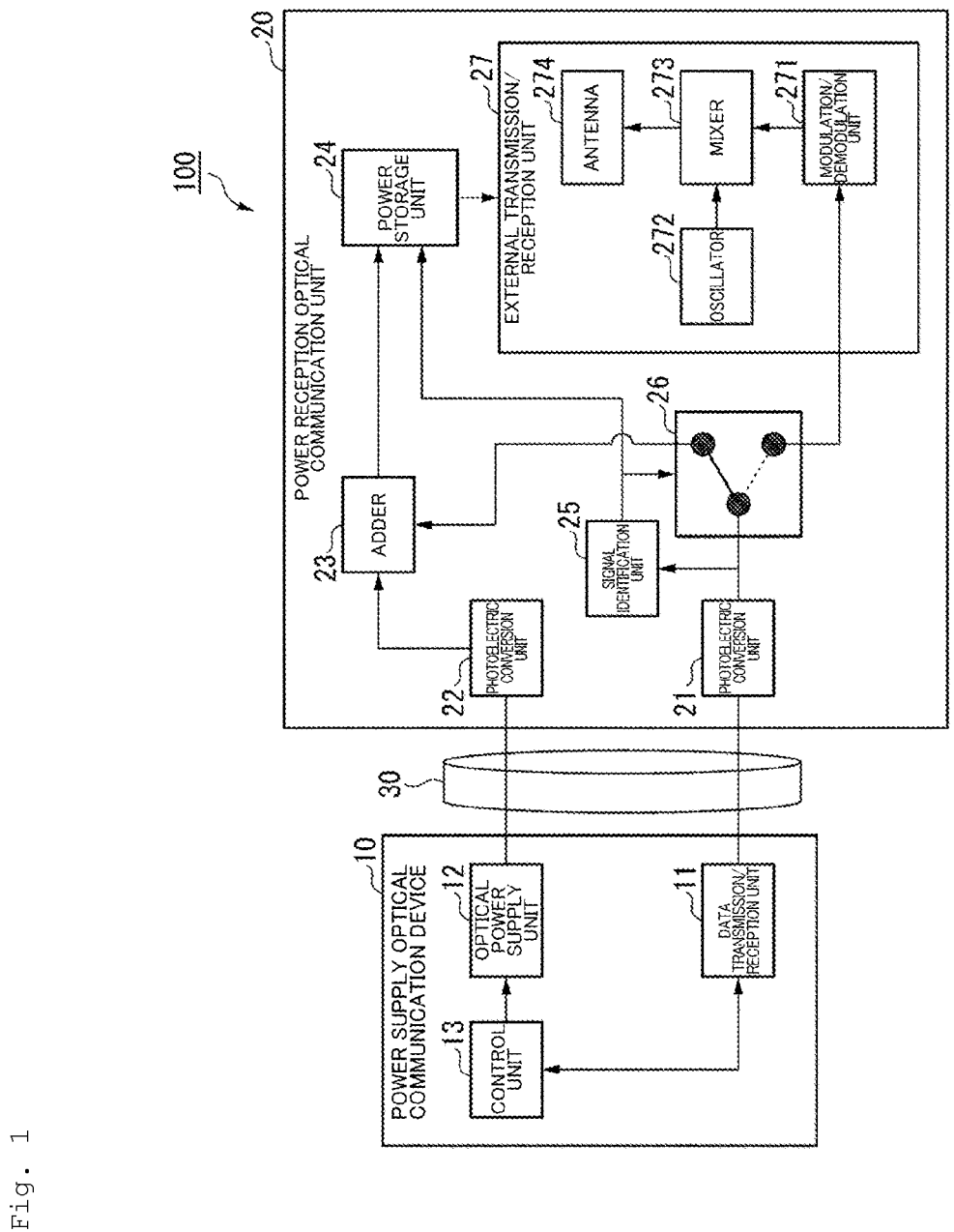
FIG. 1 is a diagram showing a configuration example of an optical power supply system according to a first embodiment.

FIG. 1 is a diagram showing a configuration example of an optical power supply system 100 according to a first embodiment.

The optical power supply system 100 includes a power supply optical communication device 10 and a power reception optical communication device 20. The power supply optical communication device 10 and the power reception optical communication device 20 are connected via an optical transmission line 30. The power supply optical communication device 10 and the power reception optical communication device 20 are connected via the optical transmission line 30, thereby enabling communication between the power supply optical communication device 10 and the power reception optical communication device 20. For example, the power supply optical communication device 10 and the power reception optical communication device 20 are connected via a power supply line and a communication line, respectively.

The power supply line and the communication line may be physically provided in the same fiber or may be provided in separate independent fibers, respectively. That is, the same fiber may be physically shared between the optical signal for communication and the optical signal for power supply, or another independent fiber may be used. In the case where the same fiber is shared between the optical signal for communication and the optical signal for power supply, there is a method of wavelength multiplexing the light for communication and the light for power supply by using different frequency bands. In FIG. 1, the power supply optical communication device 10 and the power reception optical communication device 20 have a single-star type topology configuration. Hereinafter, a direction from the power supply optical communication device 10 to the power reception optical communication device 20 is defined as a downward direction, and a direction from the power reception optical communication device 20 to the power supply optical communication device 10 is defined as an upward direction.

Although FIG. 1 shows one power reception optical communication device 20, the optical power supply system 100 may include a plurality of power reception optical communication devices 20. When a plurality of power reception optical communication devices 20 are provided in the optical power supply system 100, an optical splitter is provided between the power supply optical communication device 10 and the plurality of power reception optical communication devices 20. The optical splitter branches the optical signal transmitted from the power supply optical communication device and transmits it to each power reception optical communication device 20. The optical splitter multiplexes the optical signals transmitted from each power reception optical communication device 20 and transmits the multiplexed optical signals to the power supply optical communication device 10.

The power supply optical communication device 10 is, for example, an OLT. The power supply optical communication device includes a data transmission/reception unit 11, an optical power supply unit 12, and a control unit 13.

The data transmission/reception unit 11 performs transmission and reception of various pieces of data or transmission of the power supply light with the power reception optical communication device 20. The data transmission/reception unit 11 is, for example, an optical transceiver, and includes a light source for emitting light of a specific wavelength inside. When there is transmission data, the data transmission/reception unit 11 modulates light emitted from the light source provided inside on the basis of an electric signal of the transmission data given from the control unit 13, and thereby converting into an optical signal of the transmission data (referred to "communication light" below) and transmits the converted communication light to the optical transmission line 30. When there is no transmission data, the data transmission/reception unit 11 generates power supply light by the light source provided inside and transmits it to the optical transmission line 30. As the power supply light, for example, an optical signal having a constant voltage and no temporal change is used.

As described above, the data transmission/reception unit 11 in the present embodiment transmits the communication light to the power reception optical communication device 20 via the optical transmission line 30 when there is transmission data. When there is no transmission data, the data transmission/reception unit 11 transmits the power supply light to the power reception optical communication device 20 via the optical transmission line 30.

The data transmission/reception unit 11 includes, for example, an O/E (Optical/Electrical) converter such as a photodetector inside. The data transmission/reception unit 11 receives the optical signal transmitted via the optical transmission line converts the received optical signal into the electric signal by the O/E converter, and outputs the signal to the control unit 13.

The optical power supply unit 12 includes the light source for emitting power supply light inside, and generates the power supply light by the light source to transmit it to the optical transmission line 30. Thus, the optical power supply unit 12 transmits the power supply light to the power reception optical communication device 20.

The control unit 13 controls an operation of the data transmission/reception unit 11 and the optical power supply unit 12. For example, the control unit 13 takes in transmission data from the outside. The control unit 13 generates data of the electric signal from the taken-in transmission data, and outputs the generated data of the electric signal to the data transmission/reception unit 11. The control unit 13 takes in the data of the electric signal outputted from the data transmission/reception unit 11 and outputs the taken-in data to the outside. When there is no transmission data, the control unit 13 causes the data transmission/reception unit 11 to output the power supply light. The control unit 13 causes the optical power supply unit 12 to output the power supply light.

The power reception optical communication device 20 is driven by power supplied from the power supply optical communication device 10. The power reception optical communication device 20 is, for example, an ONU. The power reception optical communication device 20 includes a photoelectric conversion unit 21, a photoelectric conversion unit 22, an adder 23, a power storage unit 24, a signal identification unit 25, a path switch unit 26, and an external transmission/reception unit 27.

The photoelectric conversion unit 21 receives the optical signal (for example, the power supply light or the communication light) transmitted from the data transmission/reception unit 11 via an optical transmission line 30, converts the received optical signal into the electric signal to outputs the electric signal to the signal identification unit 25 and the path switch unit 26. The photoelectric conversion unit 21 is, for example, an O/E converter such as a photodetector.

The photoelectric conversion unit 22 receives the optical signal (for example, the power supply light) transmitted from the optical power supply unit 12 via the optical transmission line 30, converts the received optical signal into the electric signal to output the electric signal to the adder 23. The photoelectric conversion unit 22 is, for example, an O/E converter such as a photodetector.

The adder 23 adds the electric signal outputted from the photoelectric conversion unit 22 and the electric signal inputted via the path switch unit 26. The adder 23 outputs the added electric signal to the power storage unit 24. When there is no electric signal inputted via the path switch unit 26, the adder 23 outputs the electric signal outputted from the photoelectric conversion unit 22 to the power storage unit 24 as it is.

The power storage unit 24 includes a battery inside. The power storage unit 24 stores the power of the electric signal in the battery by performing charging processing on the basis of the electric signal. Thus, the power storage unit 24 stores power obtained on the basis of the power supply light transmitted by the optical power supply unit 12 and the power supply light transmitted by the data transmission/reception unit 11. The power storage unit 24 supplies a power supply voltage generated by using the stored power to the external transmission/reception unit 27 in response to an instruction from the signal identification unit 25. Thus, the external transmission/reception unit 27 is brought into an operable state from a sleep state.

The signal identification unit 25 always monitors the electric signal converted by the photoelectric conversion unit 21, and identifies whether the optical signal transmitted from the data transmission/reception unit 11 is the power supply light or the communication light. Specifically, the signal identification unit 25 identifies that the optical signal transmitted from the data transmission/reception unit 11 is the communication light when detecting a temporal change in the waveform of the electric signal. On the other hand, the signal identification unit 25 identifies that the optical signal transmitted from the data transmission/reception unit 11 is the power supply light when the temporal change is not detected in the waveform of the electric signal.

As described above, the optical signal having a constant voltage and no temporal change is used as the power supply light. Therefore, when the temporal change is not detected, the optical signal transmitted from the data transmission/reception unit 11 can be identified as the power supply light. On the other hand, since the communication light is modulated by the transmission data, it becomes the optical signal having the temporal change. Therefore, when the temporal change is detected, the optical signal transmitted from the data transmission/reception unit 11 can be identified as the communication light.

The signal identification unit 25 switches the output path of the path switch unit 26 in accordance with the identification result. Specifically, when the optical signal transmitted from the data transmission/reception unit 11 is the communication light, the signal identification unit 25 controls the output path of the path switch unit 26 to be a first path, and causes the power storage unit 24 to supply power to the external transmission/reception unit 27. When the optical signal transmitted from the data transmission/reception unit 11 is the power supply light, the signal identification unit 25 controls the output path of the path switch unit 26 to be a second path, and stops the power supply from the power storage unit 24 to the external transmission/reception unit 27 as necessary. The first path is a path in which a signal outputted from the path switch unit 26 is outputted to the external transmission/reception unit 27. The second path is a path in which a signal outputted from the path switch unit 26 is outputted to the adder 23.

The path switch unit 26 is a switch capable of switching an output path in accordance with the control of the signal identification unit 25. The path switch unit 26 may be an electric switch or a mechanical switch, or a combination of an electric switch and a mechanical switch as long as the input signal can be outputted to either the first path or the second path in accordance with the control of the signal identification unit 25. In the following description, the path switch unit 26 is explained as a mechanical switch, as an example.

The external transmission/reception unit 27 is a functional unit operable by power supplied from the power storage unit 24. Therefore, the external transmission/reception unit 27 is in a sleep state when power is not supplied from the power storage unit 24. When power is supplied from the power storage unit 24, the external transmission/reception unit 27 is changed from a sleep state to a start state, and becomes communicable. The external transmission/reception unit 27 communicates with an external device by wireless.

When the external transmission/reception unit 27 is connected to an external device by the wireless communication means, for example, a Wi-Fi module (Wi-Fi is a registered trademark) or the like is applied as the external transmission/ reception unit 27. The external transmission/reception unit 27 receives data transmitted by the external device at a predetermined constant period, and writes the received data in a storage unit (not shown) to store the data. The external transmission/reception unit 27 takes in the data outputted from the path switch unit 26 and transmits the taken-in data to the external device. When the storage unit (not shown) stores data to be transmitted to the external device, the external transmission/reception unit 27 reads the data from the storage unit to transmit the read data to the external device.

The external device is, for example, a sensor node such as an IoT (Internet of Things) sensor. The external device is connected to the power reception optical communication device 20 by the wireless. The external device transmits, for example, data measured by a sensor provided inside to the power reception optical communication device 20 at the predetermined constant period. The external device receives data transmitted by the power reception optical communication device 20. Note that a plurality of external devices may be present, and in this case, the plurality of external devices is connected to the power reception optical communication device 20 by the wireless.

The external transmission/reception unit 27 includes a modulation/demodulation unit 271, an oscillator 272, a mixer 273, and an antenna 274. The modulation/demodulation unit 271 and the oscillator 272 included in the external transmission/reception unit 27 are functional parts operated by power supplied from the power storage unit 24.

The modulation/demodulation unit 271 modulates or demodulates the inputted signal. For example, the modulation/demodulation unit 271 modulates the data outputted from the path switch unit 26.

The oscillator 272 generates a CW (Continuous Wave) wave and outputs it to the mixer 273.

The mixer 273 multiplies the CW wave outputted from the oscillator 272 by the modulation signal outputted from the modulation/demodulation unit 271 to up-convert the modulation signal.

The antenna 274 transmits the modulation signal up-converted by the mixer 273 to the external device by the wireless.

Figure 2:
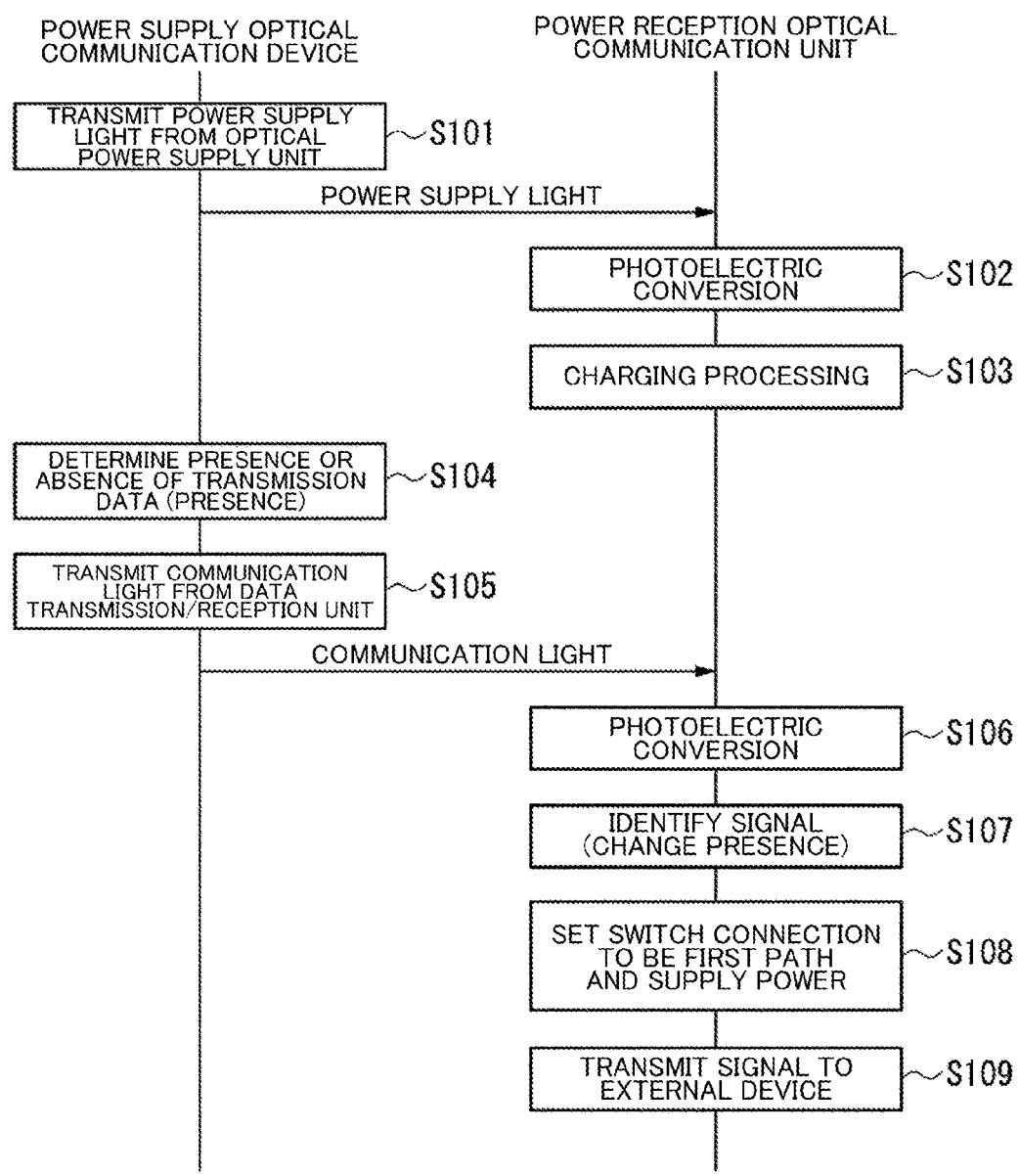
FIG. 2 is a sequence diagram showing a flow of first processing of the optical power supply system according to the first embodiment.

FIG. 2 is a sequence diagram showing a flow of first processing of the optical power supply system 100 according to the first embodiment. In the processing shown in FIG. 2, the flow of processing when there is transmission data to be transmitted to the power supply optical communication device 10 will be described.

The optical power supply unit 12 of the power supply optical communication device 10 generates the power supply light by the light source provided inside and transmits the power supply light to the optical transmission line 30 (step S101). The power supply light transmitted from the power supply optical communication device 10 is received by the power reception optical communication device 20 connected via the optical transmission line 30. Specifically, the power supply light transmitted from the optical power supply unit 12 is received by the photoelectric conversion unit 22 of the power reception optical communication device 20 via the power supply line. The photoelectric conversion unit 22 converts the received optical signal into the electric signal and outputs the converted signal to the adder 23 (step S102).

At this point of time, only the electric signal outputted from the photoelectric conversion unit 22 is inputted to the adder 23. Therefore, the electric signal outputted from the photoelectric conversion unit 22 is inputted to the power storage unit 24 via the adder 23. The power storage unit 24 performs charging processing on the basis of the electric signal outputted from the adder 23 to store the power of the electric signal in the battery (step S103). The processing from the step S101 to the step S103 is continued even while the processing after the step S104 is executed.

The control unit 13 of the power supply optical communication device 10 determines whether or not transmission data is present (step S104). For example, the control unit 13 determines that there is transmission data when the transmission data is taken in from the outside or the transmission data is present in the internal storage unit. On the other hand, the control unit 13 determines that there is no transmission data when the transmission data is not taken in from the outside and when there is no transmission data in the internal storage unit. Here, it is assumed that there is transmission data. In this case, the control unit 13 generates data of the electric signal from the transmission data, and outputs the generated data of the electric signal to the data transmission/reception unit 11.

The data transmission/reception unit 11 generates the communication light on the basis of the electric signal of the transmission data outputted from the control unit 13. The data transmission/reception unit 11 outputs the generated communication light to the optical transmission line 30 (step S105). The communication light transmitted from the power supply optical communication device 10 is received by the power reception optical communication device 20 connected via the optical transmission line 30. More specifically, the communication light transmitted from the data transmission/reception unit 11 is received by the photoelectric conversion unit 21 of the power reception optical communication device 20 via the communication line. The photoelectric conversion unit 21 converts the received optical signal into the electric signal and outputs the electric signal to the signal identification unit 25 and the path switch unit 26 (step S106).

The signal identification unit 25 inputs the electric signal outputted from the photoelectric conversion unit 21. The signal identification unit 25 always monitors the inputted electric signal and identifies the signal (step S107). It is assumed that the signal identification unit 25 detects the temporal change in the waveform of the electric signal. In this case, the signal identification unit 25 controls the output path of the path switch unit 26 to be the first path, and supplies power from the power storage unit 24 to the external transmission/reception unit 27 (step S108).

For example, when the output path of the path switch unit 26 is set to be the second path, the signal identification unit 25 switches the path so that the output path of the path switch unit 26 is set to be the first path. On the other hand, when the output path of the path switch unit 26 is set to be the first path, the signal identification unit 25 does not switch the output path of the path switch unit 26. The optical signal inputted to the path switch unit 26 is outputted to the external transmission/reception unit 27 by controlling the output path of the path switch unit 26 to be the first path.

Further, the signal identification unit 25 instructs the power storage unit 24 to supply power to the external transmission/reception unit 27. The power storage unit 24 supplies power to the external transmission/reception unit 27 in response to the instruction from the signal identification unit 25. More specifically, the power storage unit 24 supplies power to the modulation/demodulation unit 271 and the oscillator 272 of the external transmission/reception unit 27. Thus, the modulation/demodulation unit 271 and the oscillator 272 are changed from the sleep state to the start state.

The external transmission/reception unit 27 up-converts the inputted electric signal to transmit it to the external device as a wireless signal (step S109).

Figure 3:
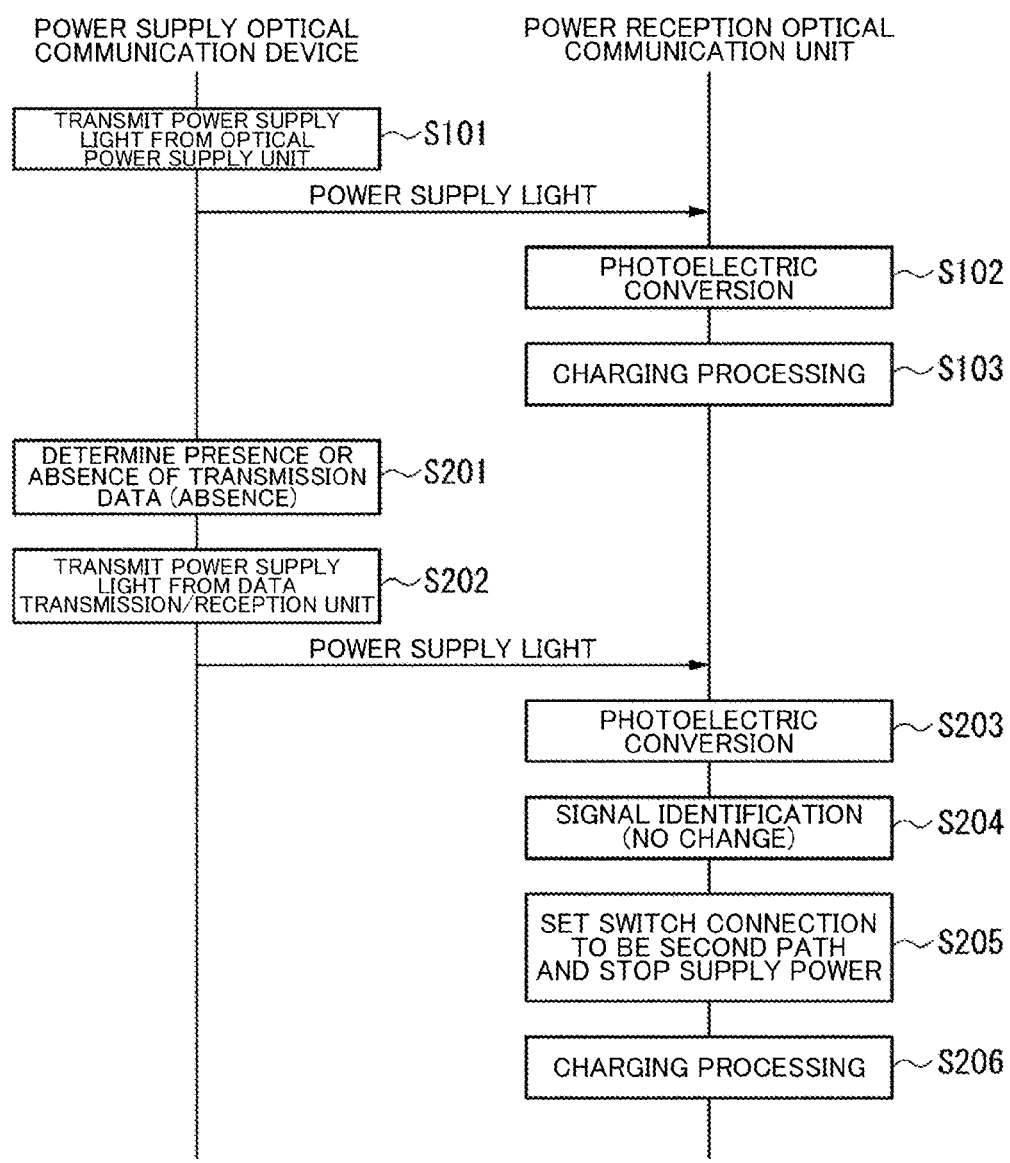
FIG. 3 is a sequence diagram showing a flow of second processing of the optical power supply system according to the first embodiment.

FIG. 3 is a sequence diagram showing a flow of second processing of the optical power supply system 100 according to the first embodiment. Note that, in the processing shown in FIG. 3, a flow of processing when there is no transmission data in the power supply optical communication device 10 will be described. In FIG. 3, processing similar to that in FIG. 2 is designated by the same reference numerals as in FIG. 2, and will not be described.

At the same time or after the processing from the step S101 to the step S103, the control unit 13 of the power supply optical communication device 10 determines the presence or absence of transmission data (step S201). Here, it is assumed that there is no transmission data. In this case, the control unit 13 causes the data transmission/reception unit 11 to output the power supply light. The data transmission/reception unit 11 transmits the power supply light to the power reception optical communication device 20 via the optical transmission line 30 (step S202). Thus, the data transmission/reception unit 11 transmits the power supply light to the power reception optical communication device 20 via the optical transmission line 30 while there is no transmission data.

The power supply light transmitted from the power supply optical communication device 10 is received by the power reception optical communication device 20 connected via the optical transmission line 30. More specifically, the power supply light transmitted from the data transmission/reception unit 11 is received by the photoelectric conversion unit 21 of the power reception optical communication device 20 via the communication line. The photoelectric conversion unit 21 converts the received optical signal into the electric signal and outputs the electric signal to the signal identification unit 25 and the path switch unit 26 (step S203).

The signal identification unit 25 inputs the electric signal outputted from the photoelectric conversion unit 21. The signal identification unit 25 always monitors the inputted electric signal and identifies the signal (step S204). It is assumed that the signal identification unit 25 does not detect the temporal change in the waveform of the electric signal. In this case, the signal identification unit 25 controls the output path of the path switch unit 26 to be the second path, and stops the power supply from the power storage unit 24 to the external transmission/reception unit 27 (step S205).

For example, when the output path of the path switch unit 26 is set to be the first path, the signal identification unit 25 switches the path so that the output path of the path switch unit 26 is set to be the second path. On the other hand, when the output path of the path switch unit 26 is set to be the second path, the signal identification unit 25 does not switch the output path of the path switch unit 26. The output path of the path switch unit 26 is controlled to be the second path, and thereby the electric signal inputted to the path switch unit 26 is outputted to the adder 23.

Further, the signal identification unit 25 instructs the power storage unit 24 to stop power supply to the external transmission/reception unit 27. The power storage unit 24 stops power supply to the external transmission/reception unit 27 in response to the instruction from the signal identification unit 25. Thus, the modulation/demodulation unit 271 and the oscillator 272 are changed from the start state to the sleep state.

The electric signal outputted from the photoelectric conversion unit 22 and the electric signal outputted from the path switch unit 26 are inputted to the adder 23. Each electric signal inputted to the adder 23 is added by the adder 23 and outputted to the power storage unit 24. The power storage unit 24 stores the power of the electric signal in the battery by performing charging processing on the basis of the electric signal after addition (step S206).

Figure 4:
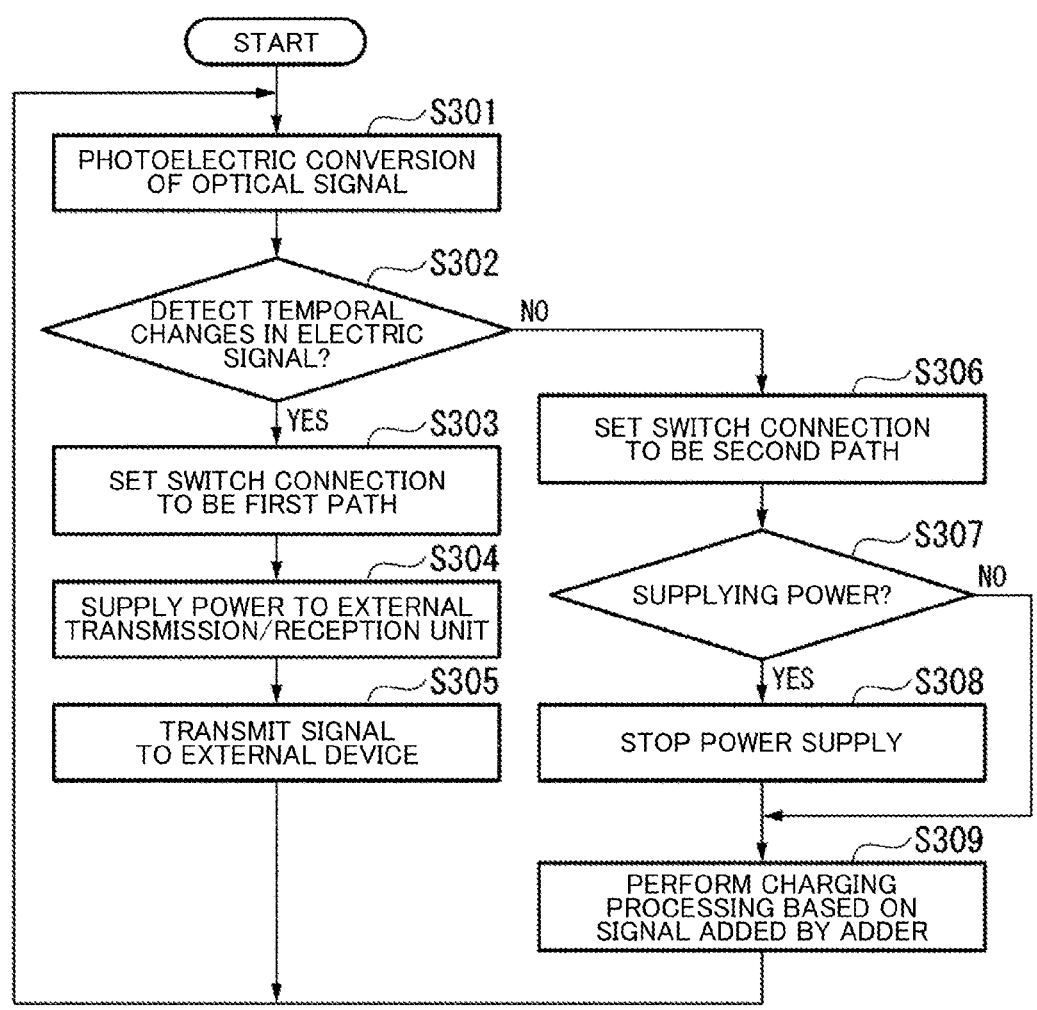
FIG. 4 is a flowchart showing a flow of processing of a power reception optical communication device according to the first embodiment.

FIG. 4 is a flowchart showing a flow of processing of the power reception optical communication device 20 according to the first embodiment. In the flow chart shown in FIG. 4, the processing of optical signal received by the photoelectric conversion unit 21 will be mainly described.

The photoelectric conversion unit 21 converts the received optical signal into the electric signal and outputs the electric signal to the signal identification unit 25 and the path switch unit 26 (step S301). The signal identification unit 25 always monitors the inputted electric signal and determines whether or not the temporal change of the electric signal is detected (step S302). When the temporal change of the electric signal is detected (step S302—YES), the signal identification unit 25 controls the output path of the path switch unit 26 to be the first path (step S303).

Further, the signal identification unit 25 instructs the power storage unit 24 to supply power to the external transmission/reception unit 27. The power storage unit 24 supplies power to the external transmission/reception unit 27 in response to the instruction from the signal identification unit 25 (step S304). The external transmission/reception unit 27 up-converts the inputted electric signal to transmit it to the external device as a wireless signal (step S305). Thereafter, it is returned to the processing of the step S301.

In the processing of the step S302, when the temporal change of the electric signal is not detected (step S302-NO), the signal identification unit 25 controls the output path of the path switch unit 26 to be the second path (step S306). Further, the signal identification unit 25 instructs the power storage unit 24 to stop power supply to the external transmission/reception unit 27. The power storage unit 24, when receiving the instruction from the signal identification unit 25, determines whether or not power is supplied to the external transmission/reception unit 27 at a point of time when receiving the instruction (step S307).

When the power is supplied to the external transmission/reception unit 27 (step S307—YES), the power storage unit 24 stops the power supply to the external transmission/reception unit 27 in response to the instruction from the signal identification unit 25 (step S308). On the other hand, when no power is supplied to the external transmission/reception unit 27 (step S307—NO), the power storage unit 24 discards the instruction from the signal identification unit 25.

After the processing of the step S308 or when power is not supplied to the external transmission/reception unit 27, the power storage unit 24 stores the power of the electric signal in the battery by performing charging processing on the basis of the electric signal added by the adder 23 (step S309).

According to the optical power supply system 100 configured as described above, the power supply optical communication device transmits the power supply light from the data transmission/reception unit to the power reception optical communication device 20 in addition when there is no transmission data to the power reception optical communication device 20. Thus, the power supply light is transmitted to the power reception optical communication device 20 from two lines. The power reception optical communication device 20 stores power obtained on the basis of the power supply light transmitted from the power supply optical communication device through two lines. As described above, in the prior art, the power obtained based on the power supply light obtained by one line is stored, whereas in the present embodiment, the power obtained based on the power supply light obtained from each of a plurality of lines is stored. Therefore, charging can be performed through the plurality of lines. As a result, charging efficiency per unit time can be improved.

Further, the power reception optical communication device 20 identifies whether the optical signal inputted via the communication line is the power supply light or the communication light in accordance with the time change of the waveform of the electric signal. Thus, it is not necessary to additionally transmit a control signal from the power supply optical communication device 10, and the sleep state can be released at a timing necessary for the power reception optical communication device 20. Therefore, useless power consumption can be suppressed.

Further, the power reception optical communication device 20 includes the path switch unit 26 for outputting the electric signal based on the optical signal inputted via the communication line to the path toward the power storage unit 24 when the optical signal inputted via the communication line is the power supply light. Thus, the electric signal based on the optical signal inputted via the communication line can be outputted to the power storage unit 24 with a simple configuration. As a result, power obtained from the electric signal based on the optical signal inputted via the communication line can also be stored in the power storage unit 24.

Second Embodiment

In the first embodiment, the signal identification unit identifies whether or not there is the temporal change by using the electric signal. In the second embodiment, a configuration in which the signal identification unit identifies whether or not there is the temporal change by using an optical signal will be described.

Figure 5:
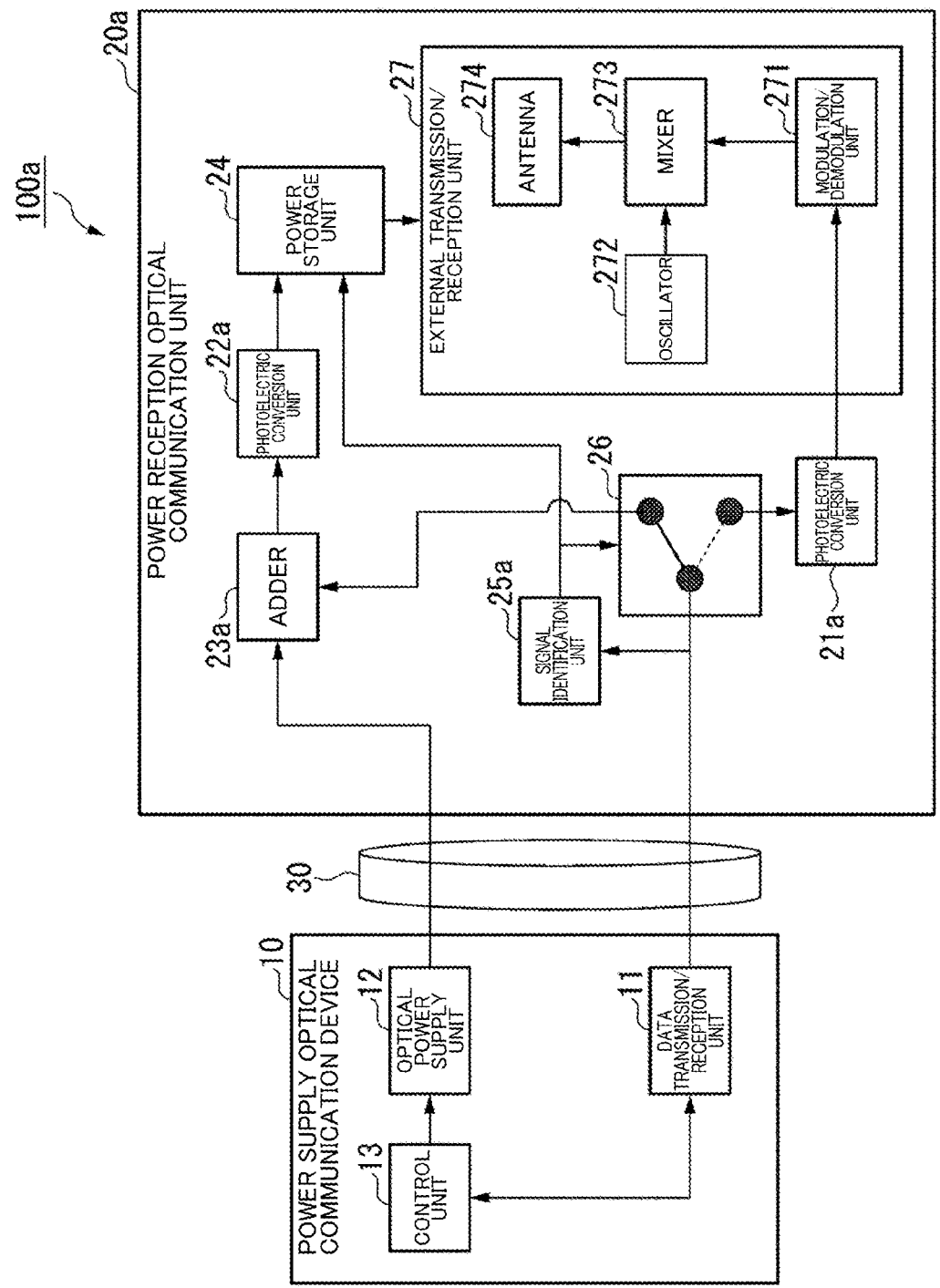
FIG. 5 is a diagram showing a configuration example of an optical power supply system according to a second embodiment.

FIG. 5 is a diagram showing a configuration example of an optical power supply system 100a according to a second embodiment.

The optical power supply system 100a includes the power supply optical communication device 10 and a power reception optical communication device 20a. The power supply optical communication device 10 and the power reception optical communication device 20a are connected via the optical transmission line 30. The power supply optical communication device 10 and the power reception optical communication device are connected via the optical transmission line 30, thereby enabling communication between the power supply optical communication device 10 and the power reception optical communication device 20a. For example, the power supply optical communication device 10 and the power reception optical communication device 20a are connected via the power supply line and the communication line, respectively. In FIG. 5, the power supply optical communication device 10 and the power reception optical communication device 20a have a single star type topology configuration.

Although one power reception optical communication device 20a is shown in FIG. 5, the optical power supply system 100a may include a plurality of power reception optical communication devices 20a. When the optical power supply system 100a is provided with a plurality of power reception optical communication devices 20a, the optical splitter is provided between the power supply optical communication device 10 and the plurality of power reception optical communication devices 20a. The optical splitter branches the optical signal transmitted from the power supply optical communication device and transmits it to each power reception optical communication device 20a. The optical splitter multiplexes the optical signals transmitted from each power reception optical communication device 20a and transmits the multiplexed optical signals to the power supply optical communication device 10. In the second embodiment, a configuration of the power reception optical communication device 20a is different from that of the first embodiment. The following only describes differences from the first embodiment.

The power reception optical communication device 20a is driven by power supplied from the power supply optical communication device 10. The power reception optical communication device includes a photoelectric conversion unit 21a, a photoelectric conversion unit 22a, an adder 23a, a power storage unit 24, a signal identification unit 25a, the path switch unit 26, and the external transmission/reception unit 27.

The power reception optical communication device 20a has the different configuration from that of the power reception optical communication device 20 in that the power reception optical communication device 20a includes the photoelectric conversion unit 21a, the photoelectric conversion unit 22a, the adder 23a, and the signal identification unit 25a in place of the photoelectric conversion unit 21, the photoelectric conversion unit 22, the adder 23, and the signal identification unit 25. For other configurations, the power reception optical communication device 20a has the same configuration as that of the power reception optical communication device 20. Therefore, the entire explanation of the power reception optical communication device 20a is omitted, and the photoelectric conversion unit 21a, the photoelectric conversion unit 22a, the adder 23a, and the signal identification unit 25a are explained.

The photoelectric conversion unit 21a is provided between the path switch unit 26 and the external transmission/reception unit 27. The photoelectric conversion unit 21a converts the optical signal outputted from the path switch unit 26 into the electric signal and outputs it to the external transmission/reception unit 27. The photoelectric conversion unit 21a is, for example, the O/E converter such as the photodetector.

The photoelectric conversion unit 22a is provided between the adder 23a and the power storage unit 24. The photoelectric conversion unit 22a converts the optical signal outputted via the adder 23a into the electric signal and outputs the electric signal to the power storage unit 24. The photoelectric conversion unit 22a is, for example, the O/E converter such as the photodetector.

The adder 23a adds the optical signal transmitted from the optical power supply unit 12 and the optical signal inputted via the path switch unit 26. Thus, the adder 23a in the second embodiment adds not the electric signal but the optical signal. The adder 23a outputs the added optical signal to the photoelectric conversion unit 22a. Note that when there is no optical signal inputted via the path switch unit 26, the adder 23a outputs the optical signal transmitted from the optical power supply unit 12 to the photoelectric conversion unit 22a as it is.

The signal identification unit 25a always monitors the optical signal transmitted from the data transmission/reception unit 11 and identifies whether the optical signal transmitted from the data transmission/reception unit 11 is the power supply light or the communication light. Specifically, the signal identification unit 25a identifies that the optical signal transmitted from the data transmission/reception unit 11 is the communication light when detecting the temporal change in the waveform of the optical signal. On the other hand, the signal identification unit 25a identifies that the optical signal transmitted from the data transmission/reception unit 11 is the power supply light when no temporal change is detected in the waveform of the optical signal. The signal identification unit 25a switches the output path of the path switch unit 26 in accordance with the identification result.

Figure 6:
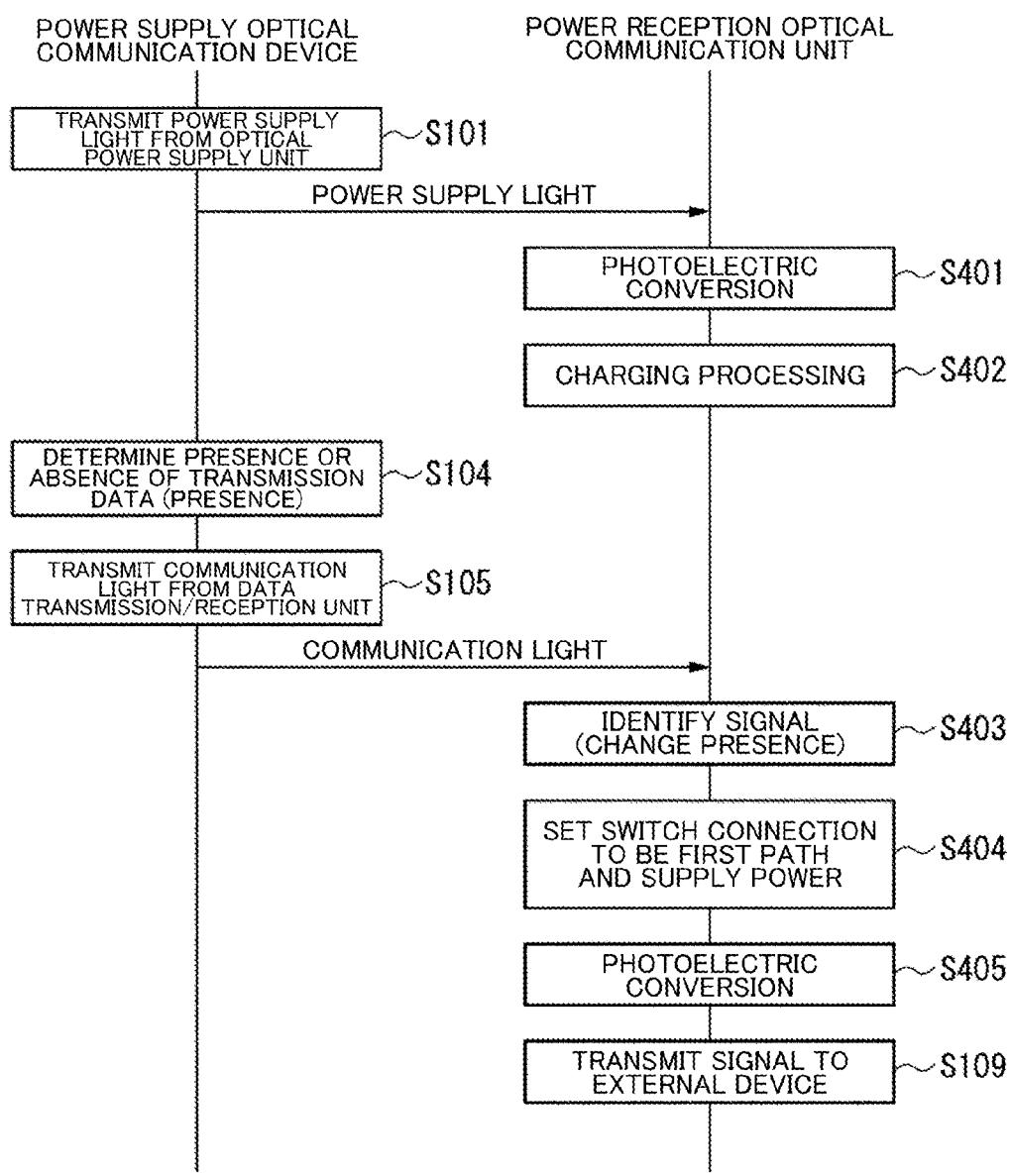
FIG. 6 is a sequence diagram showing a flow of first processing of the optical power supply system according to the second embodiment.

FIG. 6 is a sequence diagram showing a flow of first processing of the optical power supply system 100a according to the second embodiment. In the processing shown in FIG. 6, the flow of processing when there is transmission data to be transmitted to the power supply optical communication device 10 will be described. In FIG. 6, processing similar to that in FIG. 2 is designated by the same reference numerals as in FIG. 2, and will not be described.

The power supply light transmitted from the power supply optical communication device 10 by the processing of the step S101 is received by the power reception optical communication device 20a connected via the optical transmission line 30. Specifically, the power supply light transmitted from the optical power supply unit 12 is inputted to the adder 23a of the power reception optical communication device 20a via the power supply line. At this point of time, only the optical signal of the power supply light transmitted from the optical power supply unit 12 is inputted to the adder 23a. Thus, the optical signal of the power supply light transmitted from the optical power supply unit 12 is inputted to the photoelectric conversion unit 22a via the adder 23a.

The photoelectric conversion unit 22a converts the inputted optical signal into the electric signal to output the electric signal to the power storage unit 24 (step S401). The power storage unit 24 performs charging processing on the basis of the electric signal outputted from the photoelectric conversion unit 22a to store the power of the electric signal in the battery (step S402). Note that the processing from the step S101, the step S401 and the step S402 is continued even while the processing after the step S104 is executed.

The communication light transmitted from the power supply optical communication device 10 by the processing of the steps S104 and S105 is received by the power reception optical communication device 20a connected via the optical transmission line 30. Specifically, the communication light transmitted from the data transmission/reception unit 11 is received by the signal identification unit 25a and the path switch unit 26 of the power reception optical communication device 20a via the communication line. The signal identification unit 25a always monitors the received optical signal to identify the signal (step S403). It is assumed that the signal identification unit 25a detects the temporal change in the waveform of the optical signal. In this case, the signal identification unit 25a controls the output path of the path switch unit 26 to be the first path, and supplies power from the power storage unit 24 to the external transmission/reception unit 27 (step S404).

The power storage unit 24 supplies power to the external transmission/reception unit 27 in response to the instruction from the signal identification unit 25a. More specifically, the power storage unit 24 supplies power to the modulation/demodulation unit 271 and the oscillator 272 of the external transmission/reception unit 27. Thus, the modulation/demodulation unit 271 and the oscillator 272 are changed from the sleep state to the start state. The optical signal inputted to the path switch unit 26 is outputted to the photoelectric conversion unit 21a. The photoelectric conversion unit 21a converts the inputted optical signal into the electric signal and outputs the electric signal to the external transmission/reception unit 27 (step S405). The external transmission/reception unit 27 up-converts the inputted electric signal to transmit it to the external device as a wireless signal (step S109).

Figure 7:
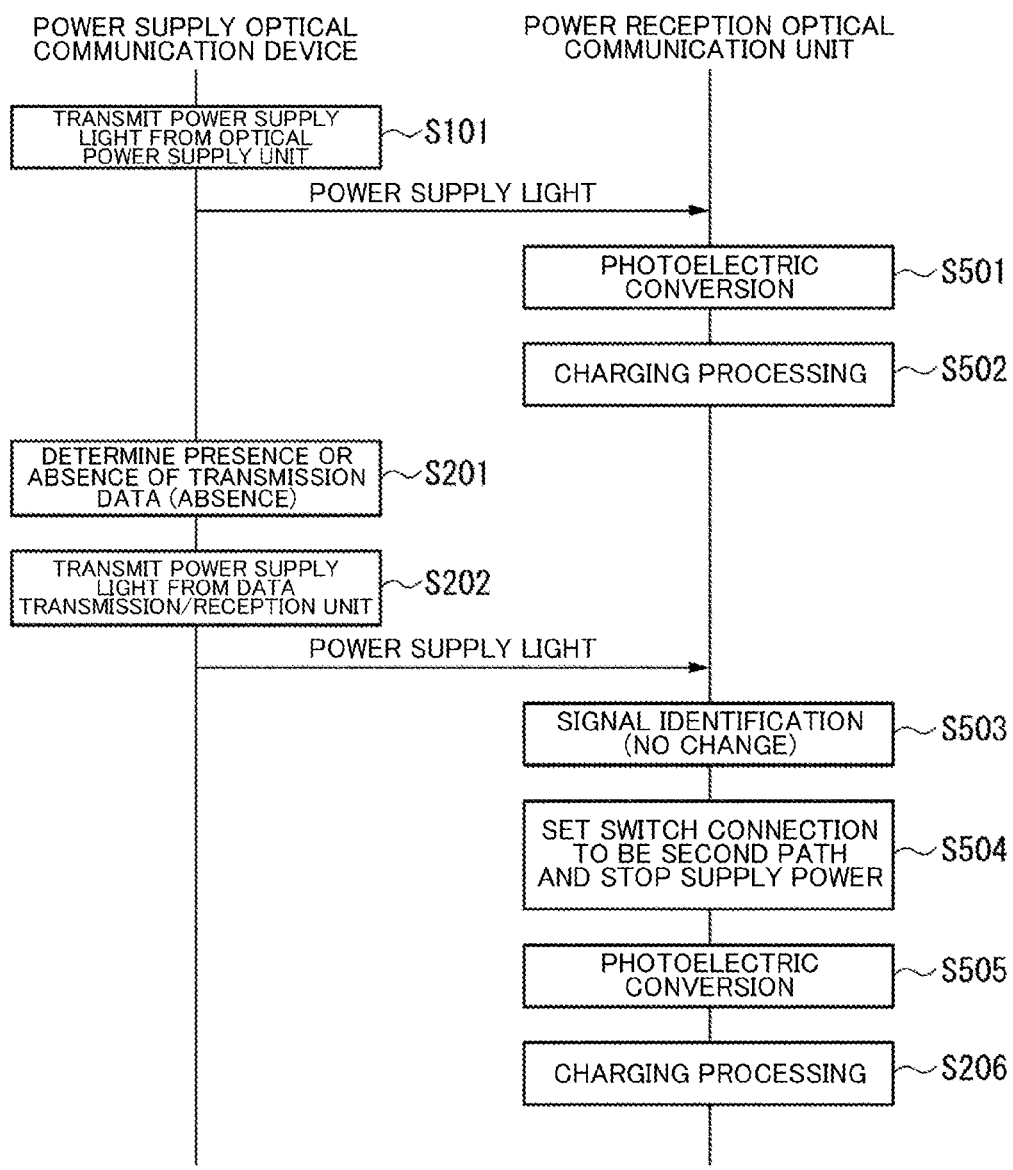
FIG. 7 is a sequence diagram showing a flow of second processing of the optical power supply system according to the second embodiment.

FIG. 7 is a sequence diagram showing a flow of second processing of the optical power supply system 100a according to the second embodiment. Note that, in the processing shown in FIG. 7, a flow of processing when there is no transmission data in the power supply optical communication device 10 will be described. In FIG. 7, processing similar to that in FIG. 2 is designated by the same reference numerals as in FIG. 2, and will not be described.

The power supply light transmitted from the power supply optical communication device 10 by the processing of the step S101 is received by the power reception optical communication device 20a connected via the optical transmission line 30. Specifically, the power supply light transmitted from the optical power supply unit 12 is inputted to the adder 23a of the power reception optical communication device 20a via the power supply line. At this point of time, only the optical signal of the power supply light transmitted from the optical power supply unit 12 is inputted to the adder 23a. Thus, the optical signal of the power supply light transmitted from the optical power supply unit 12 is inputted to the photoelectric conversion unit 22a via the adder 23a.

The photoelectric conversion unit 22a converts the inputted optical signal into the electric signal to output the electric signal to the power storage unit 24 (step S501). The power storage unit 24 performs charging processing on the basis of the electric signal outputted from the photoelectric conversion unit 22a to store the power of the electric signal in the battery (step S502). Note that the processing from the step S101, the step S501 and the step S502 is continued even while the processing after the step S201 is executed.

The communication light transmitted from the power supply optical communication device 10 by the processing of the steps S201 and S202 is received by the power reception optical communication device 20a connected via the optical transmission line 30. Specifically, the communication light transmitted from the data transmission/reception unit 11 is received by the signal identification unit 25a and the path switch unit 26 of the power reception optical communication device 20a via the communication line. The signal identification unit 25a always monitors the received optical signal to identify the signal (step S503). It is assumed that the signal identification unit 25a does not detect the temporal change in the waveform of the optical signal. In this case, the signal identification unit 25a controls the output path of the path switch unit 26 to be the second path, and stops the power supply from the power storage unit 24 to the external transmission/reception unit 27 (step S504). The optical signal inputted to the path switch unit 26 is outputted to the adder 23a by controlling the output path of the path switch unit 26 to be the second path.

The optical signal of the power supply light transmitted from the optical power supply unit 12 and the optical signal outputted from the path switch unit 26 are inputted to the adder 23a. Each optical signal inputted to the adder 23a is added by the adder 23a and outputted to the photoelectric conversion unit 22a. The photoelectric conversion unit 22a converts the added optical signal into the electrical signal and outputs the electric signal to the power storage unit 24 (step S505). The power storage unit 24 stores the power of the electric signal in the battery by performing charging processing on the basis of the electric signal (step S206).

Figure 8:
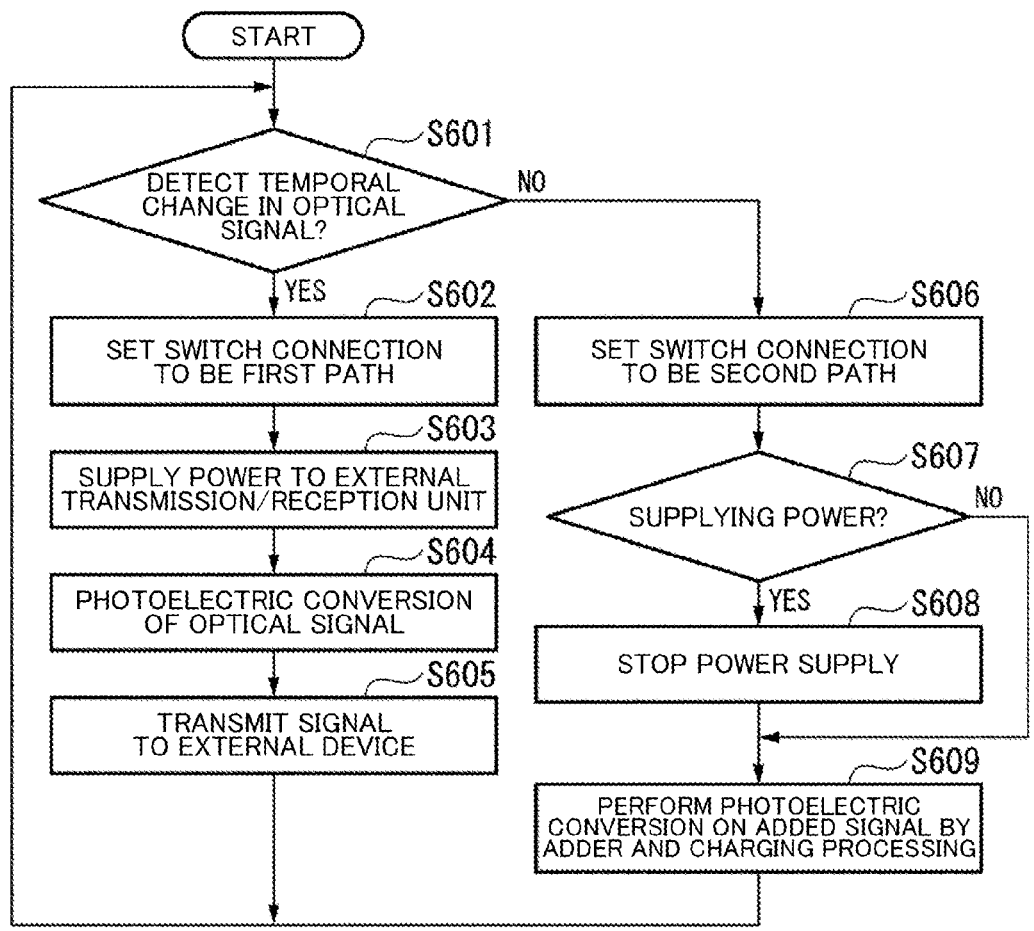
FIG. 8 is a flowchart showing a flow of processing of a power reception optical communication device according to the second embodiment.

FIG. 8 is a flowchart showing a flow of processing of the power reception optical communication device 20a according to the second embodiment. In the flowchart shown in FIG. 8, the processing of the optical signal received by the signal identification unit 25a will be described mainly. The signal identification unit 25a always monitors the received optical signal and determines whether or not the temporal change of the optical signal is detected (step S601). When the temporal change of the optical signal is detected (step S601—YES), the signal identification unit 25a controls the output path of the path switch unit 26 to be the first path (step S602).

Further, the signal identification unit 25a instructs the power storage unit 24 to supply power to the external transmission/reception unit 27. The power storage unit 24 supplies power to the external transmission/reception unit 27 in response to the instruction from the signal identification unit 25a (step S603). The optical signal inputted to the path switch unit 26 is inputted to the photoelectric conversion unit 21a via the first path. The photoelectric conversion unit 21a converts the inputted optical signal into the electric signal and outputs the electric signal to the external transmission/reception unit 27 (step S604). The external transmission/reception unit 27 up-converts the inputted electric signal to transmit it to the external device as a wireless signal (step S605). Thereafter, it is returned to the processing of the step S601.

When the temporal change of the optical signal is not detected in the processing of the step S601 (step S601-NO), the signal identification unit 25a controls the output path of the path switch unit 26 to be the second path (step S606). Further, the signal identification unit 25a instructs the power storage unit 24 to stop power supply to the external transmission/reception unit 27. When receiving the instruction from the signal identification unit 25a, the power storage unit 24 determines whether or not power is supplied to the external transmission/reception unit 27 at the time of receiving the instruction (step S607).

When the power is supplied to the external transmission/reception unit 27 (step S607—YES), the power storage unit 24 stops the power supply to the external transmission/reception unit 27 in response to the instruction from the signal identification unit 25a (step S608). On the other hand, when power is not supplied to the external transmission/reception unit 27 (step S607-NO), the power storage unit 24 discards the instruction from the signal identification unit 25a.

After the processing of the step S608 or when no power is supplied to the external transmission/reception unit 27, the photoelectric conversion unit 22a converts the optical signal added by the adder 23 into the electric signal and outputs the electric signal to the power storage unit 24. The power storage unit 24 stores the power of the electric signal in the battery by performing charging processing on the basis of the electric signal (step S609).

According to the optical power supply system 100a of the second embodiment configured as described above, the power supply optical communication device 10 transmits the power supply light from the data transmission/reception unit to the power reception optical communication device 20a in addition when there is no transmission data to the power reception optical communication device 20a. Thus, the power supply light is transmitted to the power reception optical communication device 20a from two lines. The power reception optical communication device 20a stores power obtained on the basis of the power supply light transmitted from the power supply optical communication device 10 via two lines. As described above, in the prior art, the power obtained based on the power supply light obtained by one line is stored, whereas in the present embodiment, the power obtained based on the power supply light obtained from each of a plurality of lines is stored. Therefore, charging can be performed through the plurality of lines. As a result, charging efficiency per unit time can be improved.

Further, the power reception optical communication device 20a identifies whether the optical signal inputted via the communication line is the power supply light or the communication light in accordance with the time change of the waveform of the optical signal. Thus, it is not necessary to additionally transmit a control signal from the power supply optical communication device 10, and the sleep state can be released at a timing necessary for the power reception optical communication device 20a. Therefore, useless power consumption can be suppressed.

Further, the power reception optical communication device 20a includes the path switch unit 26 for outputting the optical signal inputted via the communication line to the path toward the power storage unit 24 when the optical signal inputted via the communication line is the power supply light. Thus, the optical signal inputted via the communication line can be outputted to the power storage unit 24 with a simple configuration. The, the optical signal is converted into the electric signal before inputting to the power storage unit 24. As a result, power obtained from the electric signal based on the optical signal inputted via the communication line can also be stored in the power storage unit 24.

The optical power supply systems 100 and 100a according to the first and second embodiments are not limited to PON (Passive Optical Network), but may be applied to any system as long as it is an optical communication system that performs optical power supply.

In the optical power supply systems 100 and 100a according to the first and the second embodiments, the configurations in which signals of communication light and power supply light are identified in accordance with the presence or absence of the detection of the temporal change in the optical signal are shown. The method of signal identification in the optical power supply systems 100 and 100a is not limited to the above. For example, the method of signal identification in the optical power supply systems 100 and 100a may be performed by a method of confirming the characteristics of the frequency domain. This will be described in detail below.

Since the communication light is modulated, the communication light has a bandwidth in the frequency domain. The bandwidth of the communication light is defined as Bs. On the other hand, since the power supply light is always lit, it can be regarded that the power supply light has no bandwidth in the frequency domain (it is seen as a DC component). Then, the signal identification units 25 and 25a in the optical power supply systems 100 and 100a identify whether the received signal is the power supply light or the communication light in accordance with whether the bandwidth of the signal received via the communication line is equal to or larger than a predetermined width Bx by utilizing the difference in the frequency domain between the communication light and the power supply light. Since it is assumed that the power supply light has a slightly bandwidth Bq due to external factors such as the transmission line 30, Bx is set in the range of Bq<Bx≤Bs.

Specific processing is as follows. The signal identification unit 25 identifies that the optical signal transmitted from the data transmission/reception unit 11 is the communication light when the bandwidth of the electric signal based on the optical signal received via the communication line is equal to or larger than the predetermined width Bx, and identifies that the optical signal transmitted from the data transmission/reception unit 11 is the power supply light when the bandwidth of the electric signal based on the received optical signal is less than the predetermined width Bx. The signal identification unit 25a according to the second embodiment identifies that the optical signal transmitted from the data transmission/reception unit 11 is the communication light when the bandwidth of the optical signal received via the communication line is equal to or larger than the predetermined width Bx, and identifies that the optical signal transmitted from the data transmission/reception unit 11 is the power supply light when the bandwidth of the received optical signal is less than the predetermined width Bx. With this configuration, the type of the incoming wave can be identified depending on whether the band of the incoming signal is wider or narrower than Bx.

A part of functional unit included in the power reception optical communication devices 20 and 20a according to the above embodiments may be realized by a computer. In such a case, the program to realize their functions may be recorded on a computer-readable recording medium, and the program recorded on the recording medium may be read and executed by the computer system. It is assumed that the "computer system" mentioned here include an OS and hardware such as peripheral devices. Further, the "computer-readable recording medium" represents a transportable medium such as a flexible disk, a magneto-optical disk, a ROM, and a CD-ROM, as well as a storage device such as a hard disk embedded in the computer system. In addition, the "computer-readable recording medium" may also include a recording medium that dynamically retains a program for a short period of time, for example, a communication line used to transmit the program via a network (e.g. Internet) or other communication lines (e.g. telephone line); and a recording medium that retains the program for a certain period of time, for example, a volatile memory installed within a server and the computer system that serves as a client in that case. Moreover, the program described above may be any of a program for realizing some of the functions described above, a program capable of realizing the functions described above in combination with a program already recorded in a computer system, and a program for realizing the functions using a programmable logic device such as an FPGA (Field Programmable Gate Array).

Although the embodiments of the present invention have been described in detail with reference to the drawings, specific configurations are not limited to these embodiments, and designs and the like within a range that does not deviating from the gist of the present invention are also included.

INDUSTRIAL APPLICABILITY

The present invention is applicable to the optical communication system that performs the optical power supply.

REFERENCE SIGNS LIST

10 Power supply optical communication device
20, 20a Power reception optical communication device
11 Data transmission/reception unit
12 Optical power supply unit
13 Control unit
21, 21a Photoelectric conversion unit
22, 22a Photoelectric conversion unit
23, 23a Adder
24 Power storage unit
25, 25a Signal identification unit
26 Path switch unit
27 External transmission/reception unit
271 Modulation/demodulation unit
272 Oscillator
273 Mixer
274 Antenna

The invention claimed is:

1. An optical power supply system comprising:
a power supply optical communication device configured to supply power using an optical signal for power supply; and
a power reception optical communication device configured to be driven by power obtained from the optical signal for power supply transmitted from the power supply optical communication device, wherein
the power supply optical communication device is configured to:
transmit the optical signal for power supply to the power reception optical communication device;
transmit the optical signal for power supply to the power reception optical communication device when there is no data to be transmitted to the power reception optical communication device; and
transmit an optical signal of data to the power reception optical communication device when there is the data to be transmitted to the power reception optical communication device, and
the power reception optical communication device is configured to:
store power obtained based on the optical signal for power supply; and
switch an output path in accordance with the optical signal transmitted from the power supply optical communication device so that: i) the output path is set to be a first path for external transmission/reception that communicates with an external device, when the optical signal transmitted from the power supply optical communication device is the optical signal of the data, and ii) the output path is set to be a second path for power storage, when the optical signal transmitted from the power supply optical communication device is the optical signal for power supply.

2. The optical power supply system according to claim 1, wherein the power reception optical communication device is configured to:
identify whether the optical signal transmitted from the power supply optical communication device is the optical signal for power supply or the optical signal of the data based on the optical signal transmitted from the power supply optical communication device, and
switch the output path in accordance with an identification result.

3. The optical power supply system according to claim 2, wherein the power reception optical communication device is further configured to:
convert the optical signal transmitted from the power supply optical communication device into an electric signal, and
identify the optical signal transmitted from the power supply optical communication device as the optical signal of the data when a temporal change is detected in a waveform of the electric signal, and identify the optical signal transmitted from the power supply optical communication device as the optical signal for power supply when the temporal change is not detected in the waveform of the electric signal.

4. The optical power supply system according to claim 2, wherein the power reception optical communication device is configured to:
  identify the optical signal transmitted from the power supply optical communication device as the optical signal of the data when a temporal change is detected in a waveform of the optical signal transmitted from the power supply optical communication device, and
  identify the optical signal transmitted from the power supply optical communication device as the optical signal for power supply when the temporal change is not detected in the waveform of the optical signal transmitted from the power supply optical communication device.

5. The optical power supply system according to claim 2, wherein the power reception optical communication device is configured to:
  identify the optical signal transmitted from the power supply optical communication device as the optical signal of the data when a bandwidth of the optical signal transmitted from the power supply optical communication device or an electric signal based on the optical signal is equal to or greater than a predetermined threshold value, and
  identify the optical signal transmitted from the power supply optical communication device as the optical signal for power supply when the bandwidth is less than the predetermined threshold value.

6. An optical power supply method performed by a power supply optical communication device configured to supply power using an optical signal for power supply and a power reception optical communication device configured to be driven by power obtained from the optical signal for power supply transmitted from the power supply optical communication device, comprising:
  transmitting, by the power supply optical communication device, the optical signal for power supply to the power reception optical communication device;
  transmitting, by the power supply optical communication device, the optical signal for power supply to the power reception optical communication device when there is no data to be transmitted to the power reception optical communication device;
  transmitting, by the power supply optical communication device, an optical signal of data to the power reception optical communication device when there is the data to be transmitted to the power reception optical communication device;
  storing, by the power reception optical communication device, power obtained based on the optical signal for power supply transmitted from the power supply optical communication device via a plurality of paths; and
  switching, by the power reception optical communication device, an output path in accordance with the optical signal transmitted from the power supply optical communication device, so that: i) the output path is set to be a first path for external transmission/reception that communicates with an external device, when the optical signal transmitted from the power supply optical communication device is the optical signal of the data, and ii) the output path is set to be a second path for power storage, when the optical signal transmitted from the power supply optical communication device is the optical signal for power supply.

7. A power reception optical communication device in an optical power supply system including a power supply optical communication device configured to supply power using an optical signal for power supply and the power reception optical communication device configured to driven by power obtained from the optical signal for power supply transmitted from the power supply optical communication device, configured to:
  store power obtained based on the optical signal for power supply transmitted from the power supply optical communication device via a plurality of paths,
  the power supply optical communication device is configured to transmit an optical signal of data to the power reception optical communication device when there is the data to be transmitted to the power reception optical communication device,
  the power reception optical communication device is further configured to: switch an output path in accordance with the optical signal transmitted from the power supply optical communication device, so that i) the output path is set to be a first path for external transmission/reception that communicates with an external device, when the optical signal transmitted from the power supply optical communication device is the optical signal of the data, and ii) the output path is set to be a second path for power storage, when the optical signal transmitted from the power supply optical communication device is the optical signal for power supply.

8. The optical power supply method according to claim 6, comprising:
  identifying, by the power reception optical communication device, whether the optical signal transmitted from the power supply optical communication device is the optical signal for power supply or the optical signal of the data based on the optical signal transmitted from the power supply optical communication device, and
  switching, by the power reception optical communication device, the output path in accordance with an identification result.

9. The optical power supply method according to claim 8, comprising:
  converting, by the power reception optical communication device, the optical signal transmitted from the power supply optical communication device into an electric signal, and
  identifying, the power reception optical communication device, the optical signal transmitted from the power supply optical communication device as the optical signal of the data when a temporal change is detected in a waveform of the electric signal, and identifying the optical signal transmitted from the power supply optical communication device as the optical signal for power supply when the temporal change is not detected in the waveform of the electric signal.

10. The optical power supply method according to claim 8, comprising:
  identifying, by the power reception optical communication device, the optical signal transmitted from the power supply optical communication device as the optical signal of the data when a temporal change is detected in a waveform of the optical signal transmitted from the power supply optical communication device, and identifying, by the power reception optical communication device, the optical signal transmitted from the power supply optical communication device as the optical signal for power supply when the temporal change is not detected in the waveform of the optical signal transmitted from the power supply optical communication device.

11. The optical power supply method according to claim 8, comprising:
identifying, by the power reception optical communication device, the optical signal transmitted from the power supply optical communication device as the optical signal of the data when a bandwidth of the optical signal transmitted from the power supply optical communication device or an electric signal based on the optical signal is equal to or greater than a predetermined threshold value, and
identifying, by the power reception optical communication device, the optical signal transmitted from the power supply optical communication device as the optical signal for power supply when the bandwidth is less than the predetermined threshold value.

12. The power reception optical communication device according to claim 7, configured to:
identify whether the optical signal transmitted from the power supply optical communication device is the optical signal for power supply or the optical signal of the data based on the optical signal transmitted from the power supply optical communication device, and
switch the output path in accordance with an identification result.

13. The power reception optical communication device according to claim 12, further configured to:
convert the optical signal transmitted from the power supply optical communication device into an electric signal, and
identify the optical signal transmitted from the power supply optical communication device as the optical signal of the data when a temporal change is detected in a waveform of the electric signal, and identify the optical signal transmitted from the power supply optical communication device as the optical signal for power supply when the temporal change is not detected in the waveform of the electric signal.

14. The power reception optical communication device according to claim 12, configured to:
identify the optical signal transmitted from the power supply optical communication device as the optical signal of the data when a temporal change is detected in a waveform of the optical signal transmitted from the power supply optical communication device, and
identify the optical signal transmitted from the power supply optical communication device as the optical signal for power supply when the temporal change is not detected in the waveform of the optical signal transmitted from the power supply optical communication device.

15. The power reception optical communication device according to claim 12, configured to:
identify the optical signal transmitted from the power supply optical communication device as the optical signal of the data when a bandwidth of the optical signal transmitted from the power supply optical communication device or an electric signal based on the optical signal is equal to or greater than a predetermined threshold value, and
identify the optical signal transmitted from the power supply optical communication device as the optical signal for power supply when the bandwidth is less than the predetermined threshold value.

* * * * *